June 29, 1948.　　　H. ALLEN ET AL　　　2,444,216
PACKING
Filed March 24, 1947

HEBERT ALLEN
& MADDEN T. WORKS
INVENTORS

BY *J. Vincent Martin*
*Ralph H. Browning*
*James B. Simms*
ATTORNEYS

Patented June 29, 1948

2,444,216

UNITED STATES PATENT OFFICE 2,444,216

PACKING

Herbert Allen and Madden T. Works, Houston, Tex., assignors to Cameron Iron Works, Houston, Tex., a corporation of Texas Application March 24, 1947, Serial No. 736,717

8 Claims. (Cl. 285—131)

1

This invention relates to seal assemblies and particularly to seal assemblies which may be employed in combination with the casing heads, casing and other equipment employed at the tops of wells. The general object of this invention is to provide an improved seal assembly of the type referred to which may be readily applied to any conventional type of casing head to provide a seal between such casing head and the well casing, together with a means for testing such seal.

It is a more specific object of this invention to provide a relatively simple inexpensive seal assembly of the type referred to in which the seal between the assembly and the casing or other member passing therethrough may be formed by means of the injection of a material flowable under pressure after the assembly is in place, and in which the seal thus formed may be tested.

Another object of this invention is to provide a seal assembly of the type referred to in which spaced seals may be formed by the application of fluid pressure to a single packing assembly, and said seals tested by the injection of testing fluid under pressure between them.

One further object of this invention is to provide a seal assembly of the type referred to in which spaced seals may be affected by the application of fluid under pressure to a single packing assembly comprising a pair of packing rings with a grooved spacer and support ring between them, and a means whereby the seals formed by the spaced rings may be tested by the injection of testing fluid into the groove formed by the support ring.

Other objects and advantages of this invention will become apparent from the following description taken in connection with the accompanying drawing wherein is set forth by way of illustration and example but not by way of limitation one embodiment of this invention.

Figure 1:
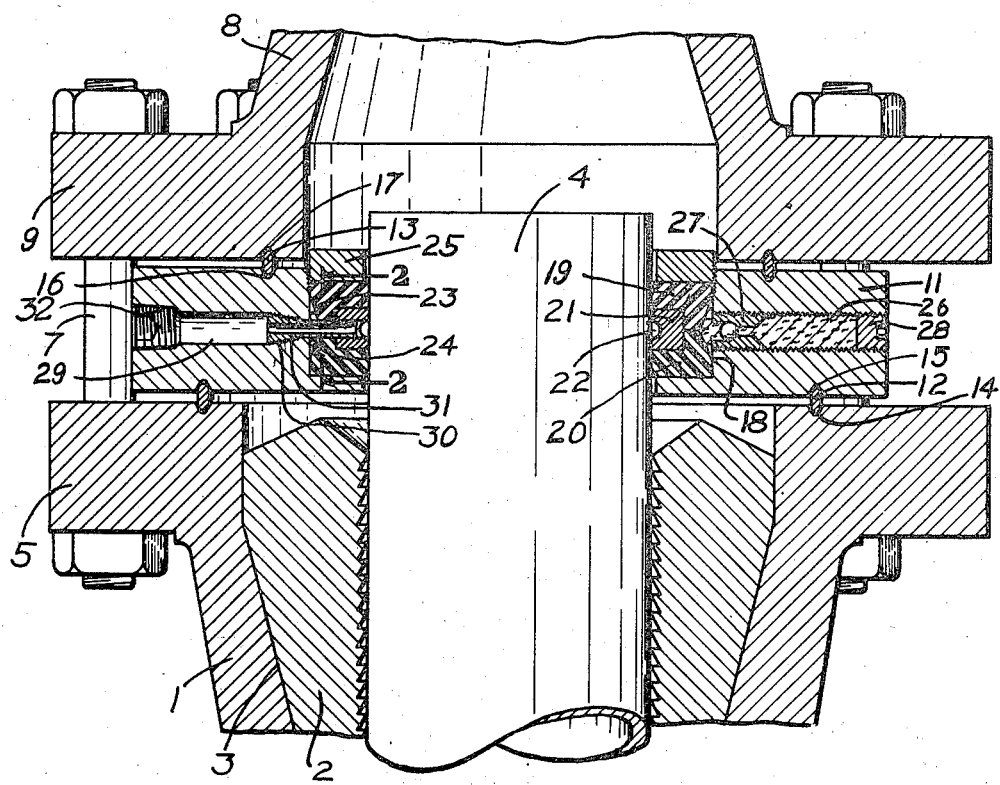
Fig. 1 is a view partly in vertical cross section illustrating an assembly constructed in accordance with this invention in place on a casing head in sealing engagement about the casing of a well.
Figure 2:
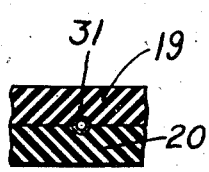
Fig. 2 is a fragmentary cross section taken along the line 2—2 of Fig. 1 showing the passage through which test fluid is applied at the point where it passes through the packing.

It will be understood that the casing head I is shown as being constructed in the usual manner and that it may be mounted in a conventional manner upon a surface casing (not shown) and that slips 2 carried inside the casing head may be mounted within the tapered bowl 3 of the

2 casing head to grip the casing 4 adjacent its upper end.

The upper end of the casing head is shown as provided with a radially extending flange 5 having openings therein for the reception of studs 7 or the like which may be employed for securing to the casing head additional equipment to be used on the well such as for example the tubing head 8. This tubing head 8 is at its lower end provided with a radially extending flange 9 having openings therethrough corresponding to the openings in the flange 5 for receiving the upper ends of the studs 7.

Located between the flanges 5 and 9 and within the circular row of studs 7 is the seal assembly to which this invention particularly relates. This assembly as illustrated comprises a body 11 and a packing assembly carried within an inwardly opening groove in the body. The body 11 is sealed to the flanges 5 and 9 by means of metallic seal rings 12 and 13 respectively, said ring 12 being mounted in grooves 14 in the flange 5, and 15 in the body 11, and the ring 13 being mounted in grooves 16 in the body 11 and 17 in the flange 9.

The body 11 has a central opening therethrough of a size to receive the casing 4 and is counterbored from its upper end to provide a countersink 18 in which the packing assembly is carried. The packing assembly comprises a pair of upper and lower packing rings 19 and 20 respectively each having an L-shaped cross section and adapted to fit together to provide between them an inwardly facing groove. In this groove is carried a relatively rigid support ring 21 providing an inwardly opening groove 22 along its inner face. It will be seen that this support ring is completely embraced by the two packing rings 19 and 20 taken together except along the inner periphery of the support ring.

Each of the packing rings 19 and 20 is preferably cut away or beveled along its outer edge adjacent the other packing ring as shown at 23 and 24 respectively so as to provide an annular recess between the packing assembly and the outer wall of the countersink in the body 11, this for a purpose presently to be set forth.

The packing assembly is retained in position within the countersink by means of a gland ring or retainer ring 25 threaded into the upper end of the countersink. This ring has an opening therethrough substantially the same size as the opening through the main body member 11, and taken with this main body member 11 provides a composite body with an inwardly facing groove in which the packing assembly is mounted.

For the purpose of forcing the packing radially inwardly into sealing engagement with the casing 4, there is provided a bore 26 leading from the exterior of the body 11 to the bottom of the packing assembly groove and communicating with the annular space about the packing assembly that is provided by the beveled portions 23 and 24 on the packing rings. In this bore 26 there is threadedly mounted a check valve 27 adjacent the inner end of the bore and a threaded ram 28 adjacent the outer end of the bore, it being understood that upon filling the bore with a material flowable under pressure the ram 28 may be threaded into the bore and employed to force such material into the space between the packing and the body 11 thereby forcing the packing radially inwardly to form spaced seals with the casing. The presence of the support ring 21 serves to space apart the two inwardly facing surfaces of the packing so that a single packing assembly may provide spaced seals.

For the purpose of testing the seals thus provided, the body at a different circumferential position is provided with a second passageway 29 leading from its exterior to the groove receiving the packing assembly. This passage 29 is threaded adjacent its outer end to receive a means for supplying testing fluid under pressure and, when not in use, to receive a closing plug to prevent the entry of dirt or the like. Adjacent its inner end this passage 29 may be threaded or otherwise formed as at 30 to receive a tubular liner 31 which may be inserted from the outside of the body after the packing assembly is in place, and which extends between the otherwise mutually engaging flanges of the packing rings and through an opening in the support ring 21 into communication with the groove 22. The sealing pressure applied to the packing rings serves also to provide a seal between the packing rings and the liner 31 whereas the liner 31 prevents the compression of the packing from closing the passage which connects the exterior of the body 11 with the groove 22. It will be seen that by connecting a source of testing fluid under pressure with the outer end of the passage 29, such fluid may be injected into the groove 22 hence it will tend to flow upwardly and downwardly along the casing, and the loss or lack of loss of testing fluid will indicate whether or not the seals provided by the packing rings 19 and 20 against the casing are tight.

In operation, the casing head will be mounted and the drilling completed and the casing run and set in the usual manner, whereupon the casing will be severed a sufficient distance above the casing head so that it will just project through and slightly above the seal assembly within the body 11 after such body has been put in place. Thereupon the seal ring 12 will be put in place in the groove 14 and the seal assembly placed over the upper end of the casing and into contact with the ring 12. The tubing head 8 or other annular member to be employed above the casing head will then be put into position with the ring 13 in the appropriate grooves in the body 11 and the tubing head 8. The studs 7 will be inserted through the holes in the flanges 5 and 9 and tightened to bring the rings 12 and 13 into sealing engagement with their respective grooves.

Thereupon a material capable of flowing under pressure and appying the necessary pressure to the packing rings 19 and 20 will be placed in the bore 26 and the ram 28 will be put in place to force such material against the packing rings 19 and 20 and in turn force them against the outer surface of the casing to provide two spaced seals on opposite sides of the groove 22. The material utilized in the bore 26 may be a material ordinarily known as plastic packing consisting of a very stiff mixture of grease, fibers, etc.

After the seals have thus been formed by forcing the packing rings 19 and 20 against the casing, they may be tested in the manner above indicated by connecting to the testing passage 29 a source of testing fluid under pressure and forcing this fluid into the groove 22. After the test has been completed the passageway 26 may be closed in any suitable manner as by the plug 32.

The purpose of providing a definite groove in the inner surface of the ring 21 as indicated at 22 is to provide for an adequate volume of testing fluid to be located close to the seals to be tested. However, it is to be understood that the ring 21 does not ordinarily fit about the casing 4 with a fluid tight engagement and that the groove 22 in the face of the ring 21 might be omitted under favorable circumstances without impairing the function of the device because the presence of the ring 21 within the packing body, but out of sealing engagement with the casing, would in and of itself hold the packing away from the casing throughout the annular space within the ring 21 and thus in effect provide a groove between the two annular seals formed by the packing, even though no groove be formed in the face of the ring 21 as shown in the drawing.

It will be seen that by the structure just described a means has been provided for carrying out and accomplishing all of the objects and advantages sought by this invention. It will be understood, however, that the structure illustrated and described is merely an example of a workable structure embodying the present invention and is not to be taken by way of limitation. The invention is to be limited in scope only by the prior art and by the terms of the appended claims.

Having described our invention, we claim:

1. A seal assembly for providing a sealed engagement with a member passing therethrough comprising a body having an opening therethrough and an inwardly opening groove about its inner periphery, a relatively soft packing in said groove, a relatively rigid support providing a permanent circumferential inwardly opening groove dividing the inner surface of said packing intermediate its ends, said body having a passage therethrough providing communication between its exterior and the bottom of said first mentioned groove whereby a flowable material under pressure may be supplied to said first mentioned groove behind said packing to force the packing radially inwardly and provide seals on opposite sides of said support about a member passing through the assembly; said body, said packing and said support having interconnecting passageways therein providing communication between the exterior of said body and said second mentioned groove, whereby a testing fluid under pressure may be supplied to said second mentioned groove to test the seals so formed.

2. A seal assembly as set forth in claim 1 wherein said packing is in the form of a pair of opposed rings of L-shape cross section and together embracing said support except along its inner periphery.

3. A seal assembly as set forth in claim 1 wherein said packing is in the form of a pair of opposed rings together embracing said support except along its inner periphery and each having its outer edge adjacent the central portion of said first mentioned groove cut away to provide a recess for receiving the flowable material employed to force said packing into sealing engagement.

4. A seal assembly as set forth in claim 1 in which the passage through said packing is lined with a relatively rigid tubular lining to prevent the closing of said passage when said packing is placed under sealing pressure.

5. A seal assembly as set forth in claim 1 wherein the groove in said body is provided by a threaded countersink in the body and a retaining ring threadedly engaging the open end of said countersink.

6. A seal assembly as set forth in claim 1 wherein said packing comprises two opposed packing rings engaging opposite ends of said support.

7. A seal assembly as set forth in claim 1 wherein said packing comprises two opposed packing rings engaging the opposite ends of said support and having parts extending toward each other about the outer periphery of said support to engage and form a seal with respect to each other and completely embrace said outer periphery.

8. A seal assembly as set forth in claim 1 wherein said packing comprises two opposed packing rings engaging opposite ends of said support and having complementary parts extending about the outer periphery of said support and engaging and forming a seal with respect to each other throughout substantially their entire periphery and in which the passage through said packing comprises a relatively rigid tubular member extending between said complementary parts of the packing rings, said complementary parts of the packing rings being engaged about said tubular member to provide a seal about the same and prevent the flow of fluid under pressure along said tubular member between the packing rings.

HERBERT ALLEN.
MADDEN T. WORKS.